(12) United States Patent
Massover et al.

(10) Patent No.: US 9,049,262 B2
(45) Date of Patent: Jun. 2, 2015

(54) METHOD AND SYSTEM FOR COMBINED PEER-TO-PEER (P2P) AND CENTRAL RELAY SERVER-BASED TELECOMMUNICATION CONFERENCING USING A TELEPHONY AND CONFERENCING PROTOCOL

(71) Applicant: TELEFONICA DIGITAL ESPAÑA, S.L.U., Madrid (ES)

(72) Inventors: Alex Massover, Madrid (ES); Gustavo Garcia, Madrid (ES); John Neystadt, Madrid (ES)

(73) Assignee: TELEFONICA DIGITAL ESPAÑA, S.L.U., Madrid (ES)

( * ) Notice: Subject to any disclaimer, the term of this patent is extended or adjusted under 35 U.S.C. 154(b) by 0 days.

(21) Appl. No.: 14/186,785

(22) Filed: Feb. 21, 2014

(65) Prior Publication Data

US 2014/0241215 A1    Aug. 28, 2014

Related U.S. Application Data

(60) Provisional application No. 61/767,987, filed on Feb. 22, 2013.

(51) Int. Cl.
| | |
|---|---|
| *H04L 12/58* | (2006.01) |
| *H04L 12/18* | (2006.01) |
| *H04W 4/08* | (2009.01) |
| *H04L 29/06* | (2006.01) |

(52) U.S. Cl.
CPC ............ *H04L 65/403* (2013.01); *H04L 65/601* (2013.01); *H04W 4/08* (2013.01); *H04L 51/04* (2013.01); *H04L 51/10* (2013.01); *H04L 12/1827* (2013.01); *H04L 12/1818* (2013.01); *H04L 69/24* (2013.01); *H04L 65/1069* (2013.01); *H04L 65/4038* (2013.01)

(58) Field of Classification Search
CPC ......... H04L 12/18; H04L 12/16; H04L 51/04; H04L 51/10; H04L 12/1827; H04W 4/08
USPC .......................... 370/254–350; 709/201–213
See application file for complete search history.

(56) References Cited

U.S. PATENT DOCUMENTS

| | | | | |
|---|---|---|---|---|
| 8,601,144 | B1 * | 12/2013 | Ryner | 709/228 |
| 8,695,077 | B1 * | 4/2014 | Gerhard et al. | 726/8 |
| 8,725,885 | B1 * | 5/2014 | Ryner | 709/228 |
| 2013/0028115 | A1 | 1/2013 | Nerst et al. | |

* cited by examiner

*Primary Examiner* — Ayaz Sheikh
*Assistant Examiner* — Debebe Asefa
(74) *Attorney, Agent, or Firm* — Sughrue Mion, PLLC

(57) ABSTRACT

A method and system for combined Peer-to-Peer (P2P) conferencing and central relay server-based conferencing using a telephony and conferencing protocol that includes Web Real-Time Communication (WebRTC) or Session Initiation Protocol (SIP), including receiving by a central relay server a request from a client device to participate in a conference call, comparing by the central relay server a received client device policy and a central relay server policy for selecting at least one of the P2P conferencing or the central relay server-based conferencing, and selecting at least one suggested connection mode for the client device based on a result of the comparing of the received client device policy and the central relay server policy, the combined P2P conferencing and central relay server-based conferencing including mixing server-based conferencing streams and P2P conferencing streams.

9 Claims, 3 Drawing Sheets

METHOD AND SYSTEM FOR COMBINED PEER-TO-PEER (P2P) AND CENTRAL RELAY SERVER-BASED TELECOMMUNICATION CONFERENCING USING A TELEPHONY AND CONFERENCING PROTOCOL

CROSS-REFERENCE TO RELATED APPLICATIONS

This application claims the benefit of U.S. Provisional Application No. 61/767,987, filed on Feb. 22, 2013, the disclosure of which is incorporated in its entirety into this application by reference. This application also claims priority from European Patent Application No. 013175731.2, filed on Jul. 9, 2013, in the European Patent Office, the disclosure of which is incorporated in its entirety into this application by reference.

BACKGROUND

1. Field

The present invention generally relates to telecommunication conferencing, and more particularly to a method and system for combined P2P and central relay server-based telecommunication conferencing using a telephony and conferencing protocol.

2. Description of the Related Art

The common conferencing approaches mainly are traditional telephony/video conferencing and Peer-two-peer (P2P) conferencing.

In traditional telephony/video conferencing, an end-user sends a stream of media packets to a central relay, which collects those streams from multiple users and mixes them into a single stream, sending it for each of the participants. On another hand, in a P2P conferencing (e.g. Tokbox®), each participant directly sends their media to each of the conference participants, and the merging of the media is done on the end device of the user.

Each approach has its benefit (e.g. multiple video streams cannot be easily mixed, while audio can; clients located closely to each other can achieve better quality by sending media P2P, central relay doing mixing can save CPU and bandwidth for each client). But there are also mixed telecommunications conferencing system, where multiple clients participate in conferencing (e.g. audio and/or video) and client devices can either send media streams P-2-P or via a central relay, which mixes media streams received from different clients and sends the mixed stream to each client. With this combined P2P and central relay server approach, the telecommunication conferencing systems can optimize the bandwidth and processing power requirements on the terminals.

Patent US 2013/0028115 A1 describes one of such teleconferencing systems combining P2P and server-based conferencing. The terminals communicate conferencing content via peer-to-peer communication, directly between terminals that are members of the group of terminals, and using the selected coding scheme, and communicate the same conferencing content with other terminals participating in the conferencing call via at least one network device such as a conferencing-server and a peer-server.

The cited patent considers call quality as the only criteria for decision between using P2P or server based conferencing. However, there is a need for a method and a more flexible system capable of mixing server-based and P2P conferencing streams on the basis of other additional technical parameters not directly related to (affecting) the effective bit-rate available to the terminal, such as geographic location, user defined policies, network reachability (firewall traversal), etc.

SUMMARY

According to a first aspect there is provided a method for combined P2P and central relay server-based telecommunication conferencing using a telephony and conferencing protocol that includes at least Web Real-Time Communication (WebRTC) or Session Initiation Protocol (SIP) wherein server-based and P2P conferencing streams are mixed on the basis of technical parameters selected among geographic location, user defined policies or network reachability (firewall traversal).

The server-based policies for selecting at least one of P2P and central relay server-based technologies in said combined telecommunication conferencing preferably are defined in terms of at least one of device capabilities, network conditions or user preferences, wherein the central relay server in a first step a) receives a request from a computer networking device of a client to participate in (that is to join) a telecommunications conference call, and then in a second step b) the request is sent by the client via a signaling protocol comprising SIP or WebRTC including information about client-based policies for selecting at least one of P2P and central relay server-based technologies in said combined telecommunication conferencing system.

As a preferred option of the invention, said client-based policies are defined in terms of at least one of device capabilities, network conditions or user preferences.

According to another embodiment, the method further executes the steps of: c) selecting said relay server at least one connection mode suggestion for the client comparing the server-based and client-based policies, d) sending said at least one connection mode suggestion as an answer to said request received from said client terminal, e) selecting said terminal one of said suggested connection modes, and f) notifying said terminal to said central relay server a confirmation of the connection mode selected.

Furthermore, according to yet another embodiment, the client terminal can ask, at any time during the telecommunication conference call, to said central relay server to change the connectivity mode by repeating the above steps b) to f).

According to a second aspect there is provided a system for combined P2P and central relay server-based telecommunication conferencing that uses WebRTC, SIP or other telephony and conferencing protocols comprising:

a central relay server with capabilities to establish and manage server-based telecommunication conference calls and including:
  means for mixing media such as audio or video streams;
  means for communicating with computer networking devices such as client terminals using a P2P mechanism for the transmission of media streams; and
  means for selecting connection modes such as server-based, peer-based of a combination server-and-peer-based for a plurality of computer networking devices participating in a telecommunication conference call;

a plurality of computer networking devices or client terminals that have capabilities to establish and participate in server-based telecommunication conference calls including:
  means for communicating with other computer networking devices using a P2P mechanism for the transmission of media streams; and
  means for selecting a connection mode such as server-based, peer-based of a combination server-and-peerbased for a participating in a combined P2P and central relay server-based telecommunication conference call, and a telecommunications network or a plurality of interconnected telecommunication networks providing at least one communication channel between said central relay server and said plurality of computer networking devices, wherein said central relay server and each client terminal implement a method according to claim 5.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION

Figure 1:
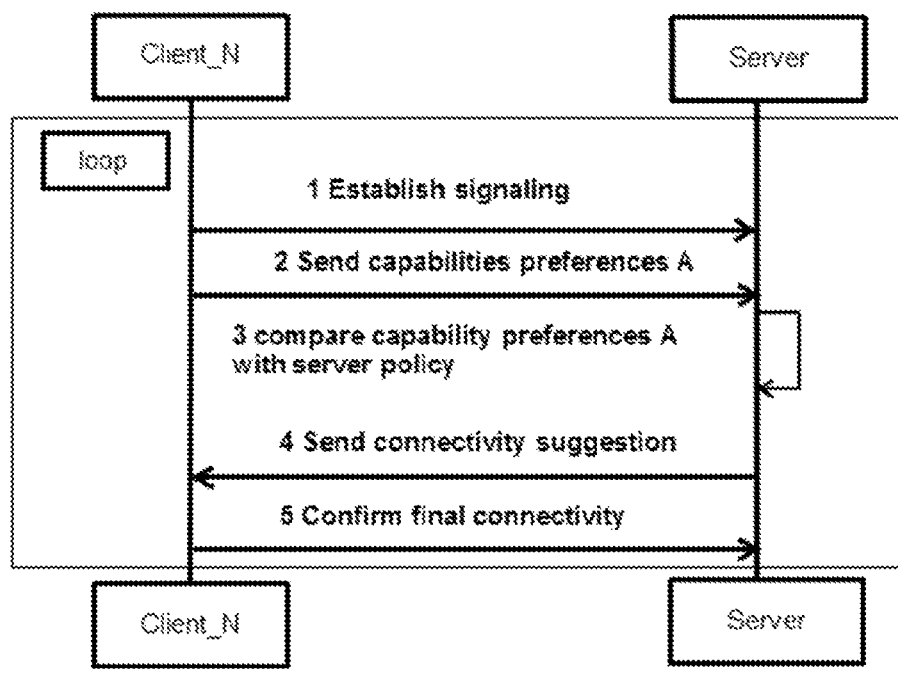
FIG. 1 is a flow diagram showing how the signaling connection is established.

A method and system for combined P2P and central relay server-based telecommunication conferencing that uses WebRTC, SIP or other telephony and conferencing protocols are described.

As described in the prior art, generally, a combined P2P and central relay server-based telecommunication conferencing scheme typically includes:

A central relay server with capabilities to establish and manage server-based telecommunication conference calls including: means for mixing media (e.g.: audio or video) streams; means for communicating with computer networking devices (e.g.: client terminals) using a P2P mechanism for the transmission of media streams; and means for selecting connection modes (i.e. server-based, peer-based of a combination server-and-peer-based) for a plurality of computer networking devices participating in a teleconference call.

A plurality of computer networking devices or client terminals that have capabilities to establish and participate in server-based telecommunication conference calls including: means for communicating with other computer networking devices using a P2P mechanism for the transmission of media streams; and means for selecting a connection mode (i.e. server-based, peer-based of a combination server-and-peer-based) for a participating in a combined P2P and central relay server-based teleconference call; and A telecommunications network (or a plurality of interconnected telecommunications networks) providing at least one communication channel between said central relay server and said plurality of computer networking devices.

Therefore, the proposed method preferably firstly defines server-based policies for selecting at least one of P2P and central relay server-based technologies in said combined telecommunication conferencing system, in which server-based policies can be defined in terms of at least one of device capabilities, network conditions or user preferences. Then, the central relay server receives a request from a computer networking device to participate in a telecommunications conference call and so the client then can send the request via a signaling protocol (e.g.: SIP) including information about client-based policies for selecting at least one of P2P and central relay server-based technologies in said combined telecommunication conferencing system, in which client-based policies can be defined also in terms of at least one of device capabilities, network conditions or user preferences.

The relay server selects at least one connection mode suggestion for the client comparing the server-based and client-based policies sending said at least one connection mode suggestion as an answer to said request received from said client terminal. Following, the client terminal selects one of said suggested connection modes and notifies to said central relay server a confirmation of the connection mode selected In a preferred embodiment, for each client terminal, the central relay mixer (server) need to be aware of which media streams need to be mixed, and which ones should be excluded, as they are sent directly. The decision on which streams to send using a P2P mechanism can be taken according to a server-based policy, based on each client terminal capabilities, bandwidth available, network latency available, client location, media stream/codec type or others parameters, including end user defined preferences.

Other embodiments can be implemented where the selection of a preferred connection mode and the decision on which media streams will be transmitted using either P2P or server-based mixing can be taken by a client terminal that request to join a conference call or by the client terminal receiving an invitation to join a telecommunications conference call.

Preferably, the central relay server and each client terminal has a set of preferences based on at least one of: Device capabilities such as CPU power, device type (mobile device, embedded device, PC, camera, other); Network conditions: type of network device is connected to (WiFi, mobile data network, Roaming connection, other) and NAT traversal status (if device is able to establish P2P connectivity or not); and user preferences enabling or disable certain types of media (video, audio), preference for P2P connection or for connectivity through the server.

In reference to FIG. 1, it is illustrated a flow diagram showing how signaling connection is established and join client-server decision on connectivity. 1 Client establishes signaling connection to the server and then 2 sends list of preferences as described above. 3 The server compares server policy with client preferences provided the connection status of the client (if client-side NAT is detected) and builds a connectivity suggestion for the client. Once this comparison is finished, 4 server sends connectivity suggestion for the client and finally, 5 client notifies the server on the final client decision regarding connectivity mode.

After connections were established, a client or a server can request to renegotiate the preferences, repeating steps 1 to 5, and then change the connectivity mode.

Figure 2:
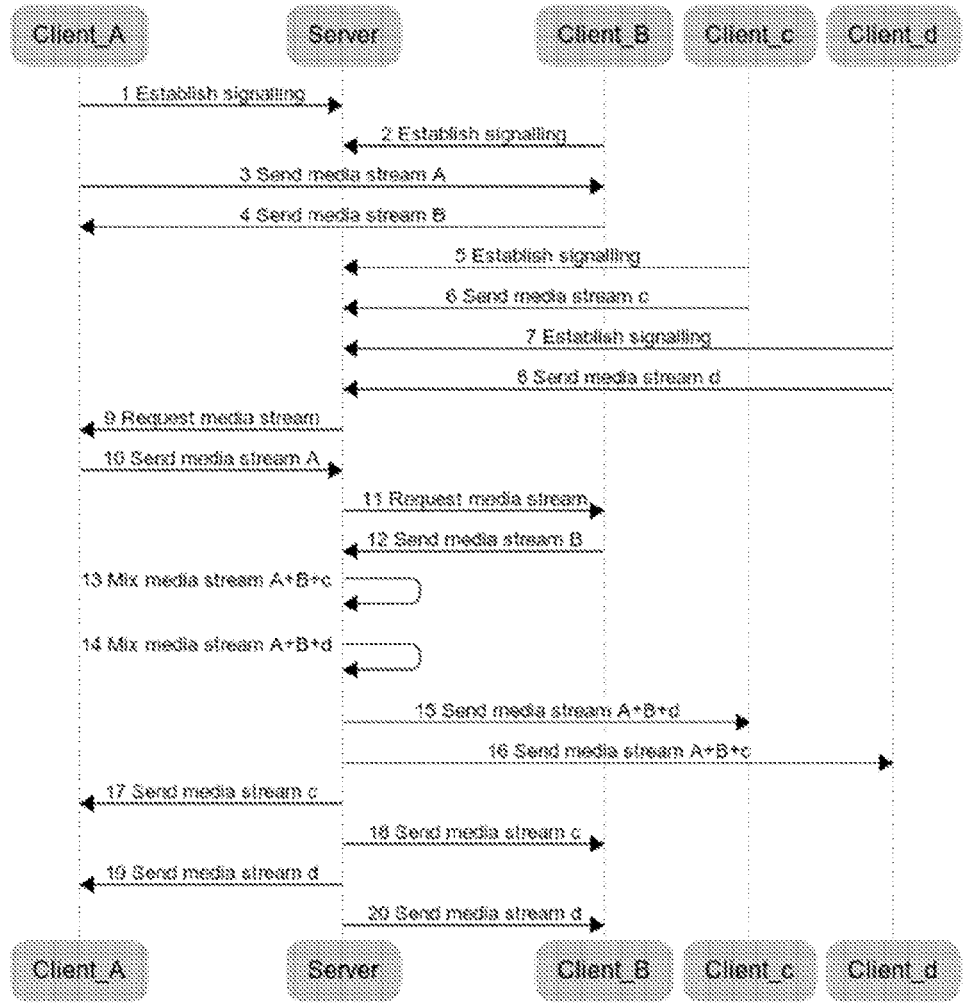
FIG. 2 is a flow diagram showing an embodiment of the proposed method based on said signaling connection established in previous FIG. 1.

In an embodiment of the invention, as shown in FIG. 2, 1 a Client_A establishes signaling connection to the server (as explained above, steps 1 to 5 of FIG. 1). In this particular example P2P mode for media was negotiated. Then, 2 Client_B establishes signaling connection to the server (as explained above, steps 1 to 5 of FIG. 1). In this case P2P mode for media was also negotiated. Once said signaling had been established, 3 Client_A sends media stream A to Client_B and 4 Client_B sends media stream B to Client_A. Then, 5 a new client (Client_c) establishes signaling connection to the server (steps 1 to 5 of FIG. 1) negotiating connectivity through the server. After that, 6 Client_c sends media stream to Server. 7 Client_d also establishes signaling connection to the server in the same way as said Client_c and 8 sends media stream d to the Server. After that, 9 Server request Client_A to send media stream to the Server and 10 Client_A, once received said request, sends media stream A to the Server. In the same way, 11 Server requests Client_B to send media stream to the Server and 12 Client_B sends media stream B to the Server. 13-14 Once Server has received media stream A and B mixes them with media streams c and d and 15-16 sends the mixed media stream from step 13 to Client_c and media stream from step 14 to Client_d respectively. Finally, Server sends 17-18 media stream c to Client_A and Client_B and 19-20 media stream d to Client_A and Client_B.

Figure 3:
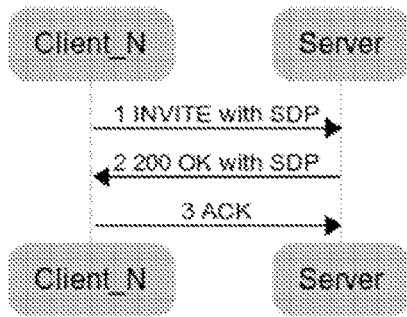
FIG. 3 is a flow diagram showing how the present invention can be implemented via SIP protocol according to an embodiment.

FIG. 3 shows another embodiment of this invention in which SIP protocol is now used. In this case, 1 Client_N sends INVITE request to server with SDP (Session Description) as a body.

EXAMPLE

INVITE <sip:conf1@conf.atlanta.example.com>SIP/2.0
From: Alice <sip:1234@conf.atlanta.example.com>; tag=from_tag-abcd
Contact: <sip:1234@127.16.70.1:5060>;audio;video; mobility="fixed";description="<PC, P2P>"
To: Bob <sip: 5678@conf.atlanta.example.com>
CSeq: 1 INVITE
Via: SIP/2.0/UDP 172.16.70.12:5060; branch=z9hG4bk-alice-1
Call-ID: 1@alice aaa-bbb-ccc
Max-Forwards: 70
Content-type: application/sdp
Content-length: . . .
  v=0
  o=alice 2890844526 2890844526 IN IP4 127.16.70.1
  s=
  c=IN IP4 127.16.70.1
  t=0 0
  m=audio 49170 RTP/AVP 97
  a=rtpmap:97 iLBC/8000
  m=video 51372 RTP/AVP 31
  a=rtpmap:31 H261/90000

In the INVITE request client capabilities preferences are described in Contact header using according to RFC 3841 or in any other way. Media types and number of streams are indicated in SDP. In this example the client is a PC and prefers to send and receive audio and video in P2P mode.

Then, 2 Server analyses client preferences from the INVITE request and may apply additional policy for example NAT detection techniques based on signaling parameters like IP address in Contact header and/or IP address connection parameter (c=) in SDP or any other technique. In this example although that client request P2P mode, server detect that IP address is in private range and decide to enforce connection through server. Server sends 200 OK SIP response:

SIP/2.0 200 OK
From: Bob <sip:conf1@ conf.atlanta.example.com>; tag=from_tag-abcd
To: Alice <sip:1234@ conf.atlanta.example.com>; tag=to_tag-abcd
Contact: <sip:conf1@ conf.atlanta.example.com>
CSeq: 1 INVITE
Via: SIP/2.0/UDP 172.16.70.12:5060;branch=z9hG4bk-alice-1
Call-ID: 1@alice aaa-bbb-ccc
Max-Forwards: 70
Content-type: application/sdp
Content-length: . . .
  v=0
  o=bob 2808844564 2808844564 IN IP4 conf.atlanta.example.com
  s=
  c=IN IP4 conf.atlanta.example.com
  t=0 0
  m=audio 49174 RTP/AVP 97
  a=rtpmap:97 iLBC/8000
  m=video 49170 RTP/AVP 31
  a=rtpmap:31 H261/90000

Finally, 3 Client confirm connectivity by sending ACK.

Figure 4:
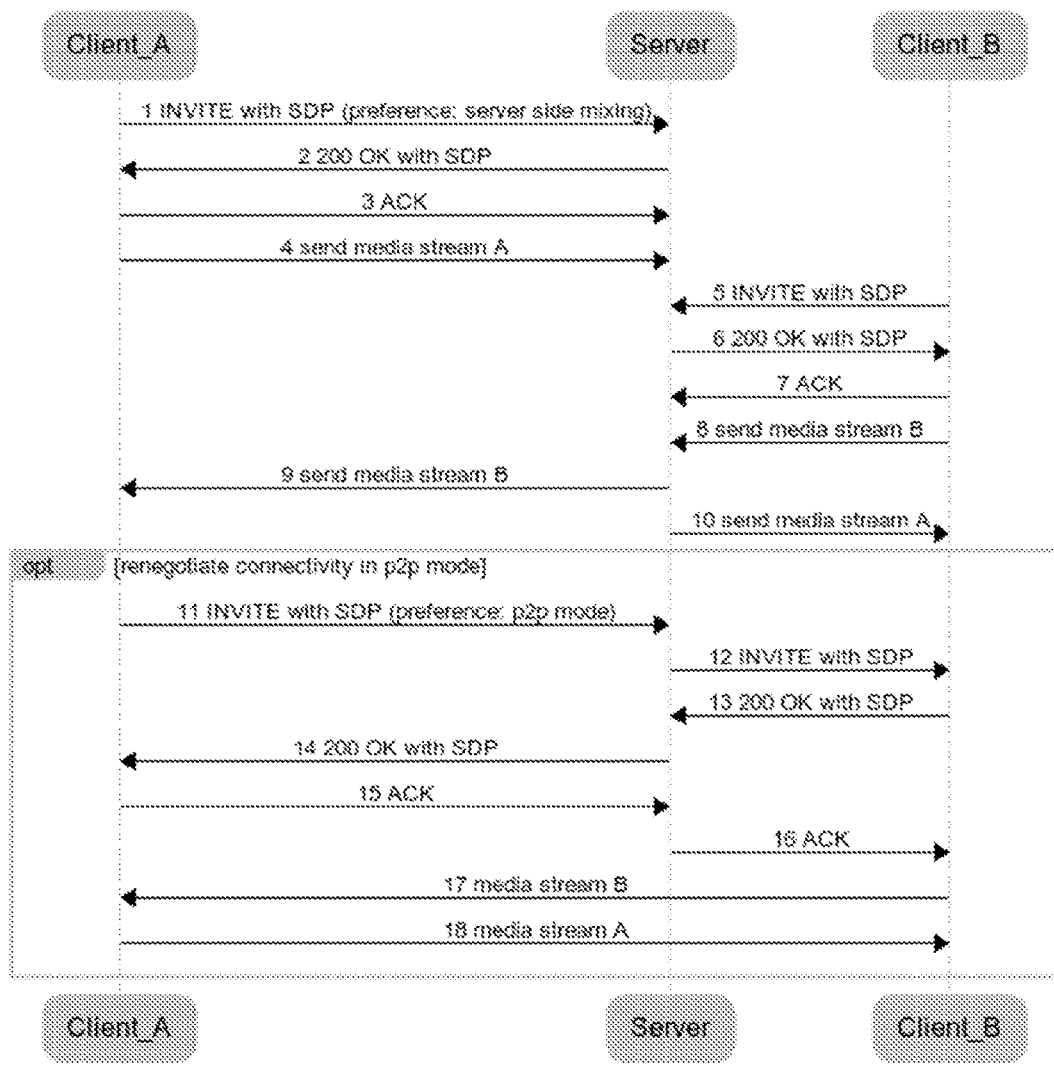
FIG. 4 is a flow diagram showing a particular embodiment of the invention based on the embodiment illustrated in previous FIG. 3.

FIG. 4 shows a particular embodiment of the invention when implemented via said SIP protocol. In this case:

1 Client_A sends INVITE request indicating preference to be server side mixing as described in FIG. 3;

2 Server replies with 200 OK with SDP setting connection parameter to Server's IP;

3 Client_A confirms with ACK message;

4 Client_A sends media stream A to Server;

5 Client_B sends INVITE request to Server without indicating preference;

6 Server replies with 200 OK with SDP setting connection parameter to Server's IP and enforcing connection through the Server;

7 Client_B confirms with ACK message;

8 Client_B sends media stream B to Server;

9 Server sends media stream B to Client_A;

10 Server sends media stream A to Client_B;

Optionally, renegotiation connectivity in P2P mode can be done, so in that case:

11 Client_A requests to renegotiate connection in P2P mode by sending INVITE request and setting preference to P2P mode as described in FIG. 3;

12 Server sends INVITE request to Client_B with SDP keeping connection parameter with IP address of Client_A;

13 Client_B replies with 200 OK with SDP;

14 Server sends 200 OK with SDP to Client_A;

15 Client_A confirms with ACK message;

16 Server sends ACK message to Client_B;

17 Client_B sends media stream B directly to Client_A (P2P mode); and

18 Client_A sends media stream A directly to Client_B (P2P mode)

The above are merely preferable embodiments of the present invention, not for limiting the protection scope of the present invention. Any modification, substitution, or improvement within the scope of this invention shall be covered by the protection scope of the present invention.

The invention claimed is:

1. A method for combined Peer-to-Peer (P2P) conferencing and central relay server-based conferencing using a telephony and conferencing protocol that comprises at least Web Real-Time Communication (WebRTC) or Session Initiation Protocol (SIP), the method comprising:
(a) receiving, by a central relay server, a request from a client device to participate in a conference call, the request including information about a client device policy for selecting at least one of the P2P conferencing or the central relay server-based conferencing;
(b) comparing, by the central relay server, the received client device policy and a central relay server policy for selecting at least one of the P2P conferencing or the central relay server-based conferencing; and (c) selecting, by the central relay server, at least one suggested connection mode for the client device, based on a result of the comparing of the received client device policy and the central relay server policy, wherein the combined P2P conferencing and central relay server-based conferencing comprises mixing server-based conferencing streams and P2P conferencing streams.

2. The method according to claim 1, wherein the central relay server policy for selecting at least one of the P2P conferencing or the central relay server-based conferencing is defined using at least one of client device capabilities, network conditions, or user preferences.

3. The method according to claim 2, further comprising sending the request from the client device to participate in the conference call via the SIP protocol or the WebRTC protocol.

4. The method according to claim 3, wherein the client device policy is defined using at least one of the client device capabilities, the network conditions, or the user preferences.

5. The method, according to claim 1, further comprising:
(d) sending, by the central relay server, the at least one suggested connection mode, to the client device, as an answer to the request to participate in the conference call received from the client device;
(e) selecting, by the client device, one of the at least one suggested connection mode; and
(f) notifying, by the client device, the central relay server regarding a selected connection mode.

6. The method according to claim 5, wherein at any time during the telecommunication conference call, said client device asks the central relay server to change the selected connection mode by repeating (a), (b), (c), (d), (e), and (f).

7. A system for combined Peer-to-Peer (P2P) conferencing and central relay server-based conferencing using a telephony and conferencing protocol that comprises at least Web Real-Time Communication (WebRTC) or Session Initiation Protocol (SIP), the system comprising:
a central relay server configured to:
(a) receive a request from a client device to participate in a conference call, the request including information about a client device policy for selecting at least one of the P2P conferencing or the central relay server-based conferencing;
(b) compare the received client device policy and a central relay server policy for selecting at least one of the P2P conferencing or the central relay server-based conferencing; and
(c) select at least one suggested connection mode for the client device, based on a result of the comparing of the received client device policy and the central relay server policy,
wherein the combined P2P conferencing and central relay server-based conferencing comprises mixing server-based conferencing streams and P2P conferencing streams.

8. The system according to claim 7, wherein the client device policy and the central relay server policy use at least one of:
device capabilities including CPU power or device type selected among mobile device, embedded device, PC, or camera;
network conditions including a type of network device that is connected and NAT traversal status; or
user preferences enabling or disabling certain types of media including video or audio, or a preference for the P2P conferencing or the central relay server-based conferencing.

9. The system of claim 7, further comprising:
a plurality of client devices configured to:
select at least one of the P2P conferencing or the central relay server-based conferencing;
in response to selecting the P2P conferencing, transmit a media stream to other client devices using the P2P conferencing; and
in response to selecting the central relay server-based conferencing, transmit the media stream to the central relay server; and
at least one telecommunications network providing at least one communication channel between the central relay server and the plurality of client devices.

* * * * *